United States Patent
Ohara

(10) Patent No.: US 7,242,829 B2
(45) Date of Patent: Jul. 10, 2007

(54) METHOD AND APPARATUS FOR INTEGRATED OPTICAL FIBER SENSING WITH NANOMETER PRECISION

(75) Inventor: Tetsuo Ohara, Sutton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/174,161

(22) Filed: Jul. 1, 2005

(65) Prior Publication Data
US 2007/0003191 A1    Jan. 4, 2007

(51) Int. Cl.
G02B 6/26 (2006.01)
(52) U.S. Cl. ....................................................... 385/52
(58) Field of Classification Search ................... 385/52
See application file for complete search history.

(56) References Cited

U.S. PATENT DOCUMENTS

| | | | | |
|---|---|---|---|---|
| 4,445,751 A | * | 5/1984 | Divens et al. ................. 385/43 |
| 5,080,458 A | * | 1/1992 | Hockaday ..................... 385/14 |
| 6,137,926 A | * | 10/2000 | Maynard ...................... 385/18 |
| 7,068,891 B1 | * | 6/2006 | Cook et al. ................... 385/52 |
| 2004/0231887 A1 | * | 11/2004 | Van Horn et al. .......... 174/262 |
| 2007/0058912 A1 | * | 3/2007 | Ohara ......................... 385/97 |

* cited by examiner

Primary Examiner—Ellen E. Kim
(74) Attorney, Agent, or Firm—RatnerPrestia

(57) ABSTRACT

An optical package suitable for alignment with a conductively coated optical fiber includes a base having an electrode which forms a capacitance with the conductively coated optical fiber. An optical alignment system computes a capacitance measure when the optical fiber is precisely aligned and further after attachment of the fiber to the package causes a misalignment. The capacitance measures at precise alignment and at misalignment allow computation of a displacement amount from the precise alignment in at least one direction. The optical fiber may be adjusted according to the direction and amount provided by the alignment system to reposition the fiber to its precise alignment.

24 Claims, 8 Drawing Sheets

METHOD AND APPARATUS FOR INTEGRATED OPTICAL FIBER SENSING WITH NANOMETER PRECISION

FIELD OF THE INVENTION

The present invention relates generally to fiber-coupled optical assemblies and, more particularly, to an apparatus and method of aligning an optical fiber to an optical device by measuring at least one capacitance formed between a conductively coated optical fiber and an electrode on a fiber mounting member.

BACKGROUND OF THE INVENTION

The importance of achieving highly accurate mutual alignment of individual components in any optical system is well known. The miniature dimensions of components used in modern optical communication systems render such accurate alignment difficult both to achieve and to maintain. For example, one issue of concern in the construction of laser transmitters is that of efficiently coupling the optical output from an optical device such as a laser diode into an optical fiber. To obtain efficient coupling, the fiber end is desirably precisely aligned with the emitting area of the laser. When such alignment is achieved, the fiber is then fixed in place, desirably by a method that enables the precise alignment to be sustained throughout the device lifetime.

Typically, fiber-coupled diode lasers are packaged in metal butterfly packages, which may be gold plated, and the fiber is held in alignment with the laser using one of the epoxy, laser weld, or solder attachment techniques with or without a ferrule. Epoxy attachment is low cost but may have too much thermal expansion for high precision attachments. Furthermore, it may not be reliable over a long period of time due to outgassing and alignment shifts arising from aging and temperature cycling. Laser weld techniques are reliable but use costly ferrulization of the fiber and specially designed mounts or clips to allow weld attachment of the ferrulized fiber. The mounts/clips are expensive, large, and may creep over time. Solder attachment techniques, on the other hand, are reliable and low cost, and have become prevalent in the art. Existing solder attachment techniques however, tend to use an integrated heating mechanism and/or a specially configured platform to isolate the heat used for solder reflow. These thermal management means may be expensive and/or undesirably large.

Typically, precise alignment of the fiber involves aligning the end of the fiber in at least one direction relative to the optical device to provide a maximum energy transfer from the optical device to the fiber. A further optical device such as a photodiode or any light emitting diode may be used to measure an optical power coupled into the optical fiber. The fiber may be precisely aligned in at least one of a vertical and a lateral direction. The fiber may also be adjusted horizontally to minimize a gap distance between the fiber and the optical device. The fiber may be adjusted in vertical and lateral alignment until a maximum power is determined. A predetermined gap distance may be used for horizontal alignment or the gap distance may be adjusted while visually monitoring the distance to avoid direct contact between the fiber and the optical device.

It is difficult, however, to maintain alignment between the optical component and the fiber when the fiber is soldered due to turbulent flows and capillary forces exhibited by the molten solder. It is further difficult to determine the precise direction of misalignment after the fiber has been soldered.

SUMMARY OF THE INVENTION

The present invention is embodied in an optical package base for use with a conductively coated optical fiber disposed above the top surface of the base of the package and having an end aligned with an optical device. The optical package base includes a patterned electrode provided adjacent to the top surface of the optical package base and a fiber mount area on the top surface of the optical package base. The conductively coated optical fiber forms a capacitance with the patterned electrode. An optical alignment system for use with the optical package base includes electrical probes and a capacitance detection circuit for determining the capacitance, the capacitance detection circuit coupled to the electrical probes.

The present invention is further embodied in an optical alignment system for aligning a conductively coated optical fiber within an optical package with an optical device to provide an optimally aligned position of an end of the optical fiber with respect to the optical device. The optical alignment system includes two electrodes provided on the optical package, means for measuring at least two capacitances between the conductively coated optical fiber and the two electrodes respectively, to develop first and second capacitance measures. The present invention further includes means for adjusting the optical fiber until the first capacitance measure and the second capacitance measure have substantially equal values, whereby coarse alignment of the optical fiber at the optimally aligned position is attained.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
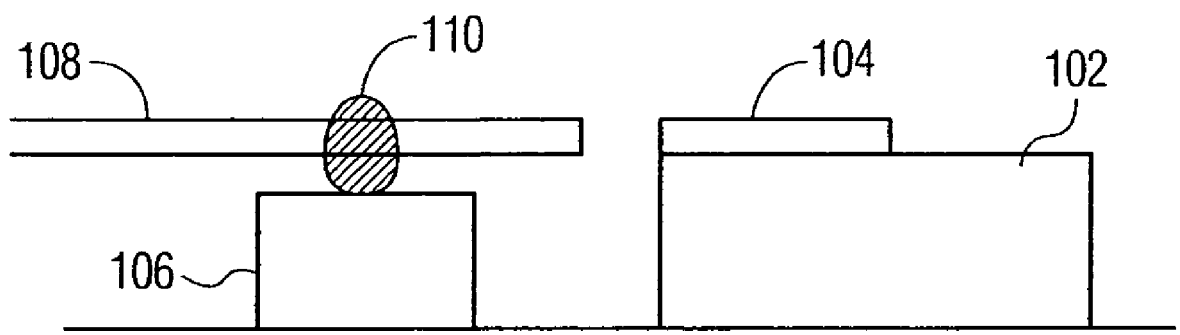
FIG. 1 (Prior Art) is a side view of an optical package including a coupling element to couple an optical fiber to a fiber mounting member.

Referring now to the drawing, in which like reference numbers refer to like elements throughout the various figures that comprise the drawing, FIG. 1 illustrates an optical package 100 according to the prior art. Prior art package 100 includes a substrate 102 for mounting an optical device 104. A fiber mounting member 106 provides an attachment point for optical fiber 108 that is attached to fiber mounting member 106 with coupling element 110 (e.g. solder). Coupling element 110 maintains the fiber 108 in a desired alignment throughout the lifetime of optical package 100.

Figure 2:
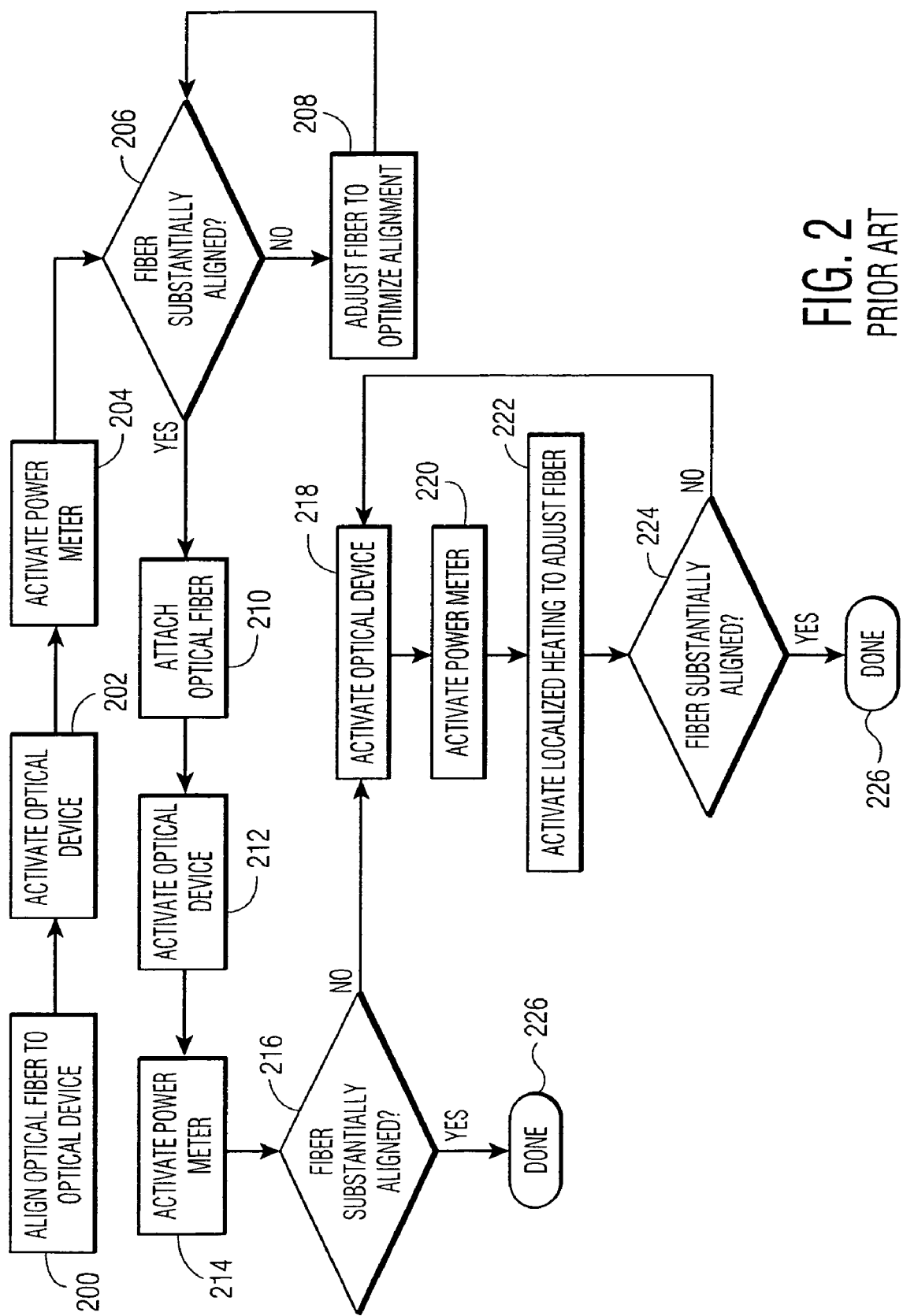
FIG. 2 (Prior Art) is a flow chart illustrating a method of aligning an optical fiber to an optical device.

Referring now to FIG. 2, a prior art method of aligning optical fiber 108 to optical device 104 is described. In step 200, optical fiber 108 is coarsely aligned with optical device 104. In step 202, optical device 104 is activated, providing optical energy into optical fiber 108 according to an alignment between optical fiber 108 and optical device 104. In step 204, a power meter (not shown) is activated and a coupling efficiency between optical fiber 108 and optical device 104 is desirably measured by the power meter.

Step 206 checks the measured coupling efficiency to determine whether or not optical fiber 108 achieved a substantially desired alignment with optical device 104. If not, the optical fiber position is adjusted in step 208 to optimize the alignment according to the coupling efficiency. Steps 206 and 208 may be repeated until a peak coupling position is determined.

After a peak coupling position is determined or if no misalignment is determined, step 206 leads to step 210. In step 210, optical fiber 108 is desirably attached to fiber mounting member 106 with coupling element 110. Step 210 may introduce a misalignment of the optical fiber in at least one direction.

In step 212, the optical device is activated. In step 214, a power meter is activated to measure the coupling efficiency indicative of the alignment. Step 216 checks the measured coupling efficiency to determine the presence of misalignment. If no misalignment was introduced, step 216 leads to step 226, which indicates that the alignment process is complete.

If a misalignment was introduced at step 210, step 216 leads to step 218. In step 218, the optical device is activated and, in step 220, the power meter is activated to measure the coupling efficiency. In step 222, a localized heating may be provided to adjust the optical fiber. The localized heating may be provided to coupling element 110, to fiber mounting member 106 or optical fiber 108. Localized heating may, for example, soften or anneal the coupling element 110 to allow optical fiber 108 to move. Localized heating selectively adjusts the fiber position based on a determined misalignment. Localized heating may move the fiber in a direction towards the peak coupling position.

Step 224 checks the measured coupling efficiency to determine whether or not optical fiber 108 is substantially aligned with optical device 104 according to the peak coupling position. If a misalignment was determined, step 224 leads to step 218. Steps 218 through 224 are repeated until an optimal alignment is reached. If no misalignment was introduced or an optimal alignment is determined, step 224 leads to step 226, which indicates that the alignment process is complete.

Although the prior art method is useful for attaching optical fibers in a precise and non-contact method, the method typically requires a realignment of the attached optical fiber. Further realignment may be required, particularly after the initial heating of a coupling element.

Although a power meter may measure a coupling efficiency, it may not provide a measure of an offset direction from the peak coupling position. This offset may occur after the initial heating of a coupling element when the fiber may not be easily moved. The power meter does not provide a direction of misalignment. The direction and amount of misalignment is typically estimated and adjusted during a next reheating process.

The present invention provides a method of monitoring the precise location of the optical fiber during the initial alignment through the coupling element reheating process. An exemplary optical package includes an exemplary fiber mounting member provided with electrodes. A capacitance formed between an optical fiber and the electrodes is used to provide a measure of displacement from an optimal position. The number of electrodes may be increased to provide a precise displacement measure in three dimensions.

Figure 3A:
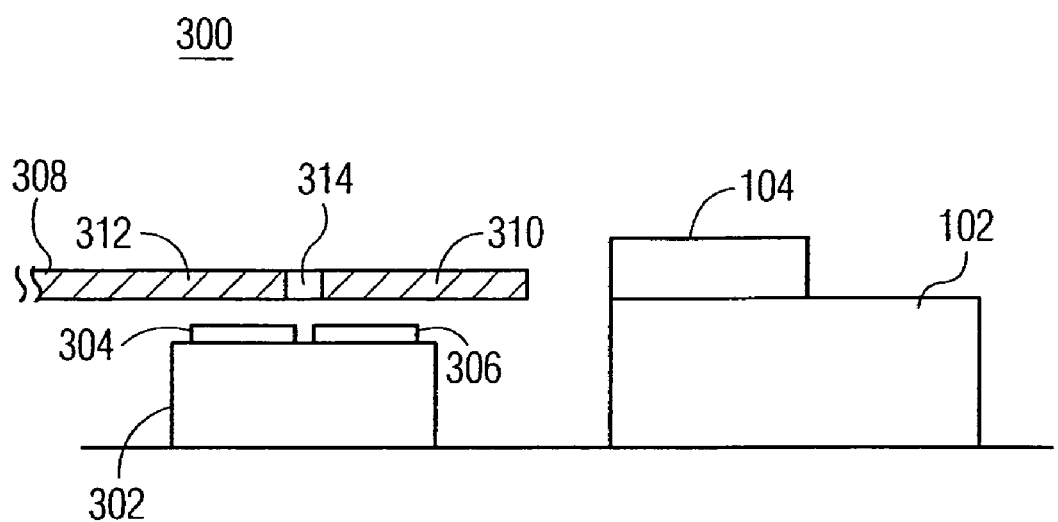
FIG. 3a is a side view illustrating an exemplary optical package which includes a fiber mounting member having a fiber attachment area and an electrode area according to the present invention.
Figure 3B:
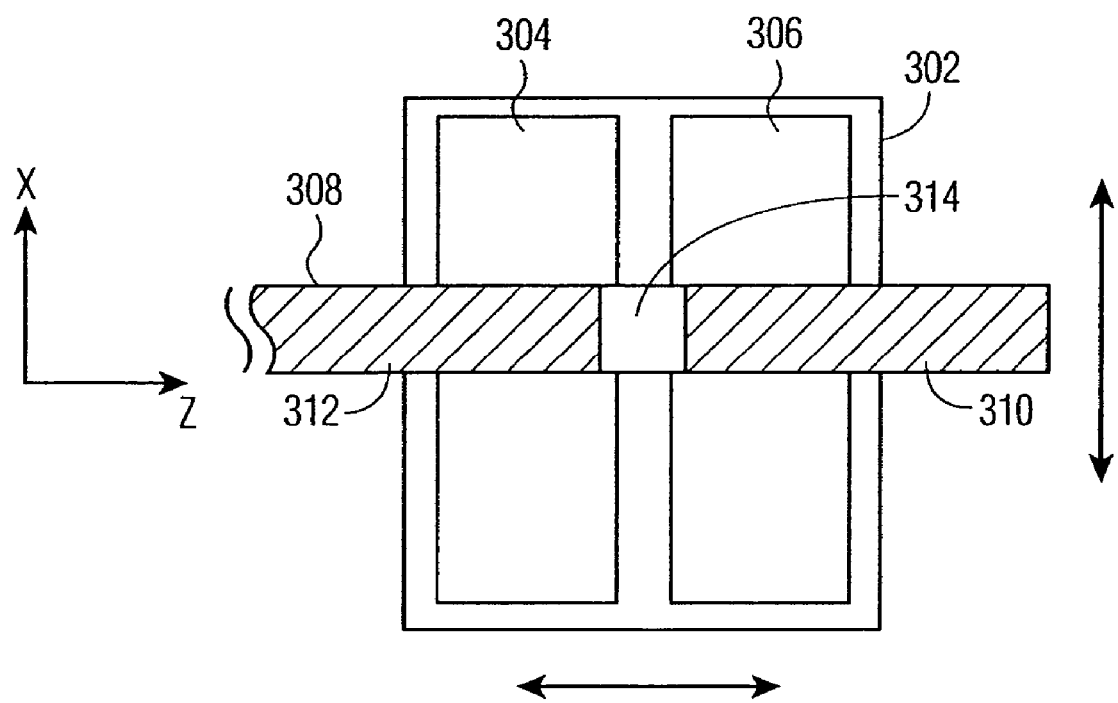
FIG. 3b is an overhead view of an exemplary fiber mounting member according to the present invention.

Referring now to FIGS. 3a and 3b, an exemplary optical package 300 is described. FIG. 3a illustrates a side view of exemplary optical package 300. Exemplary optical package 300 includes a substrate 102 for mounting optical device 104. Exemplary fiber mounting member 302 includes a fiber mount area 304 and an electrode area 306. Optical fiber 308 may be attached to fiber mount area 304 with a coupling element (e.g. solder, not shown).

Optical fiber 308 desirably includes a metallization 310 proximate to electrode area 306. Although metallization 310 is shown to extend to the end of optical fiber 308, it is understood that metallization 310 may be provided to only a segment of optical fiber 308 proximate to electrode area 306. Metallization 310 may not cover a tip of the optical fiber. Although the invention is described in terms of a metallized optical fiber, it is contemplated that any conductively coated optical fiber may be used wherein at least a portion of the conductive coating forms one plate of a capacitor, as described below.

Metallization 312 may further be provided to fiber 308 proximate to fiber mount area 304. Although metallization 312 is shown to extend along the remaining length of optical fiber 308, metallization 312 may be provided to only a segment of optical fiber 308 proximate to fiber mount area 304. A non-conductive region 314 may or may not be provided to fiber 308 between fiber mount area 304 and electrode area 306 to prevent stray capacitive effects between a coupling element and metallization 310 after the coupling element is provided to attach fiber 308 to fiber mount area 304.

FIG. 3b illustrates an overhead view of fiber mounting member 302. Optical fiber 308 may be centered above fiber mounting member 302. Fiber mount area 304 and electrode area 306 may be provided, for example, on the top surface of fiber mounting member 302.

As described above and illustrated in FIG. 3b, optical fiber 308 may become misaligned in at least one direction due to the application of a coupling element. Misalignment in a first direction is represented by x-axis arrows. Although not shown in FIG. 3b, optical fiber may become misaligned in a second direction. Misalignment in a second direction is represented by the y-axis arrows illustrated in FIG. 7. Misalignment in a third direction is illustrated in FIG. 3b by the z-axis arrows. The optical fiber may become misaligned in any single one of these directions or any combination thereof.

A coupling element of the exemplary invention may be, for example solder. The solder may be provided to fiber mount area 304 as a solder preform (not shown). It is contemplated that the coupling element may be made of a number of different materials used for mounting optical fibers, which have desired thermal and mechanical properties. It is noted that the desired thermal and mechanical properties may vary depending on the type of the optical device. Coupling element materials may include metal or glass solder, thermally cured epoxy, ultraviolet (UV) cured epoxy and air-cured epoxy. Exemplary metal solder preforms may desirably be formed of any solder alloy which has desired thermal and mechanical properties, such as lead tin solder, gold-based solder, indium-based solder, gallium-based solder, bismuth-based solder, cadmium-based solder or lead-free solder.

It is contemplated that optical device 104 may include any device or surface from which an optical signal may radiate or receive an optical signal, such as a photodiode, a single mode semiconductor laser, a multi-mode semiconductor laser, an optical mirror, a second optical fiber, a semiconductor optical amplifier, an optical concentrator, and a light-emitting diode.

Fiber mount area 304 may be a metallization layer on the top surface of fiber mounting member 302, as shown in FIG. 3b, to aid in the attachment of the optical fiber to optical package 300. When metal solder is used as the coupling element, the metallization layer may include at least one of gold, silver, aluminum, copper, titanium, tungsten or nickel. Electrodes provided in electrode area 306 may include at least one of gold, silver, aluminum copper, titanium, tungsten or nickel.

The optical fiber may be one of wedge-lensed, ball, conical and flat-cleaved single mode or multi-mode fiber. As described below, the optical fiber desirably includes metallization 310 proximate to electrode area 306 to provide a capacitance between the optical fiber and at least one electrode in electrode area 306.

Although metallization 312 is shown on fiber 308 proximate to the fiber attachment area 304, the optical fiber may be non-metallized in this region and attached with glass solder. A bare glass fiber region within fiber mount area 304 may be attached with metallic solder, with slip between the fiber and solder being desirably minimized by the use of an adhesive, for example, an optical epoxy having low outgassing, low coefficient of thermal expansion and low movement during cure or thermal excursions.

Figure 3C:
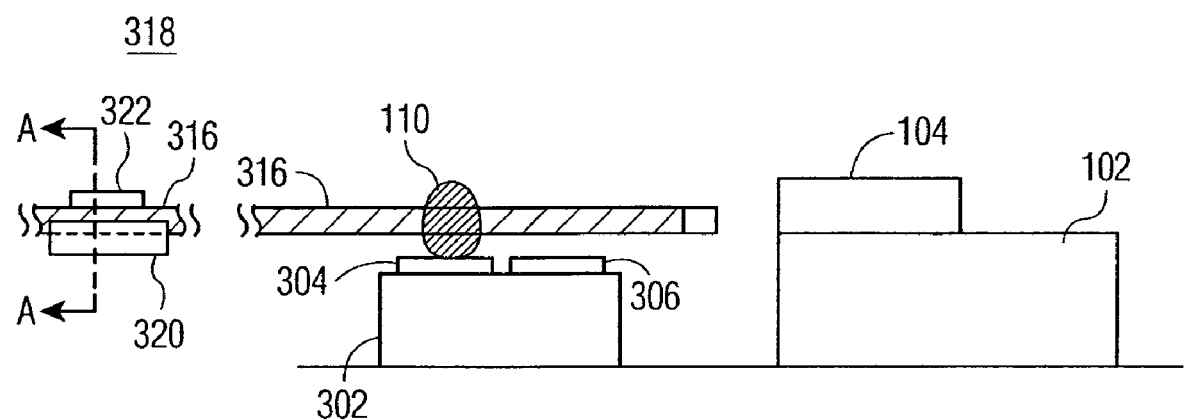
FIG. 3c is a side view illustrating an exemplary fiber gripper used with an exemplary optical package according to the present invention.
Figure 3D:
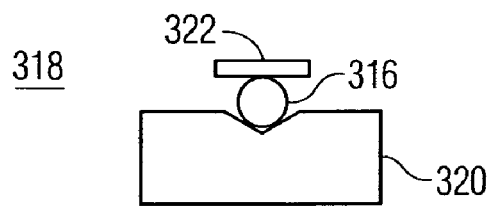
FIG. 3d is a cross section view along cutting plane A-A' of an exemplary fiber gripper according to the present invention.

Referring now to FIGS. 3c and 3d, an exemplary fiber gripper 318 that may be used with an exemplary optical package is described. A metallized optical fiber 316 may be provided to exemplary fiber mounting member 302 as described above. Fiber gripper 318 may include a fiber support 320 and a clamp 322 to secure optical fiber 316 within fiber support 320. Fiber support 320 desirably functions as an electrode for coupling to metallized optical fiber 316.

Optical fiber 316 may be attached to fiber mount area 304 with a coupling element 110 (e.g. solder) as described above. The metallization of optical fiber 316 may extend from a region proximate to electrode area 306 to exemplary fiber gripper 318. The metallization may further extend to a tip of the optical fiber 316. It is understood that the metallization may be any conductive coating as described above.

FIG. 3d illustrates a cross section of fiber gripper 318 along cutting plane A-A'. Optical fiber 316 may be supported by a groove provided to fiber support 320. Clamp 322 may be placed on top of optical fiber 316 such that a force applied by clamp 322 and the groove of fiber support 320 secures the optical fiber 316 in place.

Fiber support 320 may be manufactured from any conductive material or conductive material may be provided on a portion fiber support 320 to act as an electrode. Exemplary fiber gripper 318 desirably measures a capacitance between optical fiber 316 and at least on electrode on electrode area 306 as described below. Fiber support 320 may further include a contact (not shown) for connection to a capacitance measurement circuit (not shown). It is further understood that clamp 322 may be similarly provided with electrode material.

Figure 4:
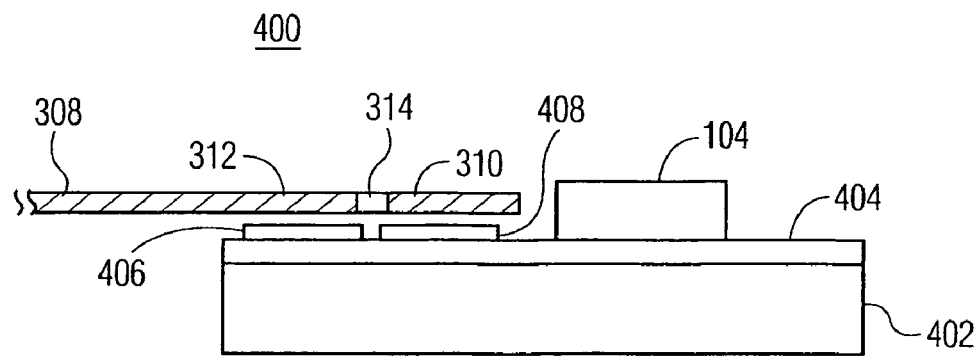
FIG. 4 is a side view illustrating an alternate exemplary optical package which includes a fiber mounting member having a fiber attachment area and an electrode area according to the present invention.

Referring now to FIG. 4, an alternate embodiment of an exemplary optical package is described. Exemplary optical package 400 includes a substrate 402 and a fiber mounting member 404. Optical device 104 is mounted on fiber mounting member 404. Fiber mounting member 404 further includes fiber mount area 406 and electrode area 408. Optical fiber 308 may be attached to fiber mount area 406 as described above. Fiber mount area 406 and electrode area 408 are provided on fiber mounting member 404 in a similar formation as described above and illustrated in FIG. 3b. Optical fiber 308 includes metallization 310 proximate to electrode area 408 and may be further metallized 312 proximate to fiber mount are 406. Fiber 308 may include a non-metallized region 314 between metallizations 310 and 312 as described above.

Figure 5:
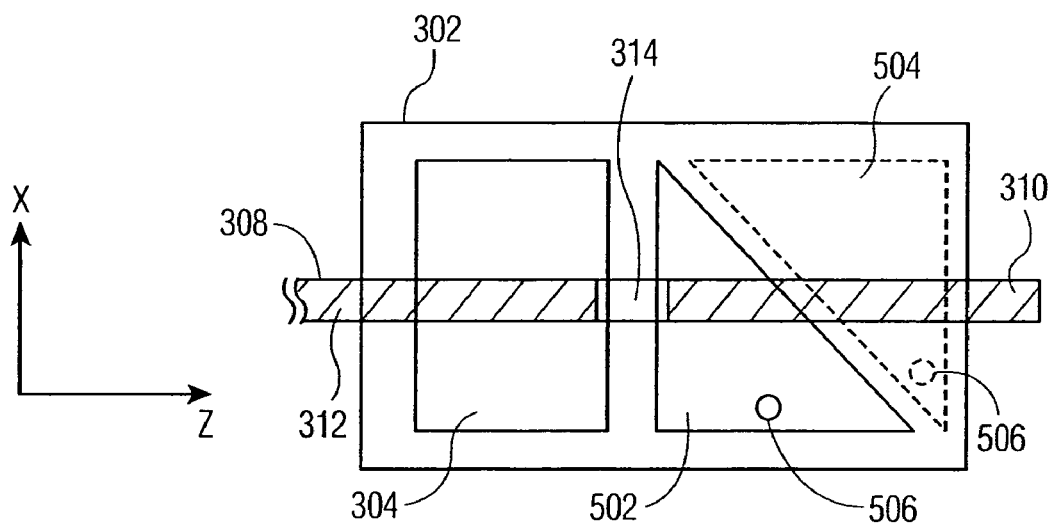
FIG. 5 is an overhead view illustrating an arrange of two electrodes provided on an exemplary fiber mounting member according to the present invention.

Referring now to FIG. 5, an arrangement of at least one electrode on an exemplary fiber mounting member is described. Exemplary fiber mounting member 302 of exemplary optical package 300 may include two electrodes 502 and 504 provided adjacent to a top surface of fiber mounting member 302. It is understood that electrodes may be similarly provided to exemplary fiber mounting member 404 in electrode area 408. Electrodes 502 and 504 are desirably triangular shaped and disposed adjacent to each other. Exemplary electrodes 502 and 504 are disposed such that a minimum stray capacitance effect is provided between each electrode. A fiber mount area 304 is provided for attaching optical fiber 308 to fiber mounting member 302. Optical fiber 308 is desirably metallized along the length of optical fiber at least in a vicinity of electrodes 502 and 504.

Electrodes 502 and 504 are illustrated as triangular shaped to provide a linearly varying capacitance between each electrode and metallized optical fiber 308 when an optical fiber is moved in the first direction. It is contemplated that electrodes 502 and 504 may be of any shape provided a measurable variation in capacitance along the first direction may be determined. Electrodes 502 and 504 may further includes contacts 506 disposed on each of electrodes 502 and 504 for providing connection of the electrodes to a further apparatus (not shown).

It is contemplated that mounting member 302 may consist of a single electrode 502 if only displacement in a single direction is desired. A capacitance between metallization 310 and electrode 502 may be used to determine a displacement in a single direction, namely the second direction. Electrode 502 may further give an indication of displacement in the first direction. A single electrode however, may not provide a precise calculation of misalignment in the first direction.

As described above, a capacitance is desirably formed between metallized optical fiber 308 and each of electrodes 502 and 504. The cylindrical shape of the fiber provides an insensitivity of the capacitance measurement to fiber rotation. An optical fiber position in the first direction may be measured by taking the difference between the two capacitances. An optical fiber position in the second direction may be measured by taking the sum of the two capacitances.

Peak coupling position first and second direction capacitances may thus be determined prior to a misalignment by a coupling element. A displacement in the first direction and the second direction may be determined by computing the change in first direction and second direction position from the peak coupling position measured before the application of the coupling element. A misalignment in a first and second direction may thus be precisely determined.

Figure 6:
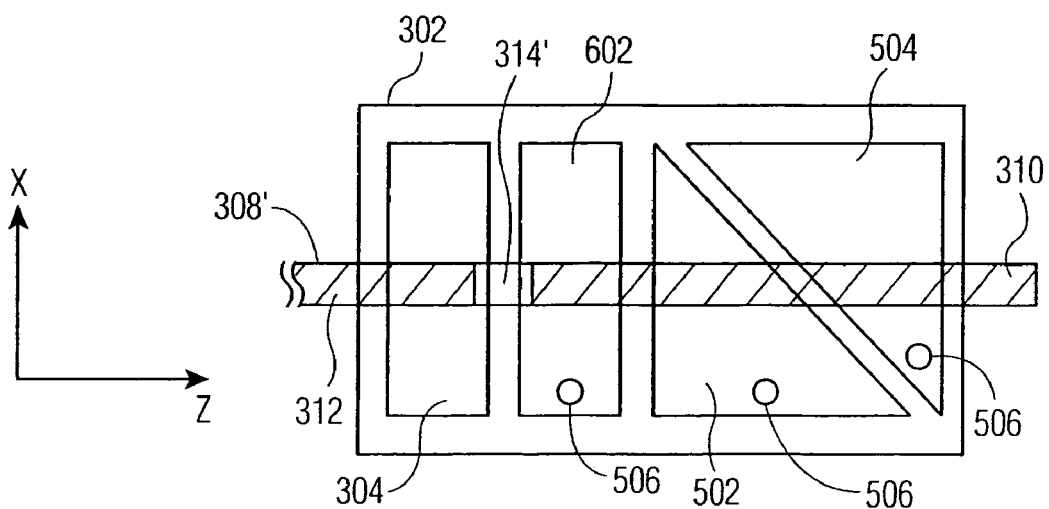
FIG. 6 is an overhead view illustrating an alternate arrangement of three electrodes provided on an exemplary fiber mounting member according to the present invention.

Referring now to FIG. 6, an arrangement of three electrodes on an exemplary fiber mounting member 302 of exemplary optical device 300 is described. It is understood that electrodes may be similarly provided to exemplary fiber mounting member 404 in electrode area 408. Electrodes 502 and 504 are triangular shaped electrodes with contacts 506 provided as described above. A third electrode 602 is provided adjacent to a top surface of fiber mounting member 302. Electrodes 502, 504 and 602 are desirably disposed such that a minimum stray capacitance effect is provided between each electrode. A contact 506 may be further provided to electrode 602 to allow a connection with a further apparatus (not shown).

Optical fiber 308' is provided metallization 310 on a portion of fiber 308' proximate to electrodes 502, 504 and 602. Optical fiber 308' is similar to optical fiber 308' except that non-metallized region 314' may be a different length to provide a variable capacitance across electrode 602, as described below.

First and second capacitances formed between each of electrodes 502 and 504 and metallized optical fiber 308' are described above for optical fiber 308. A third capacitance may be formed between electrode 602 and optical fiber 308'. Metallization 310 forms a capacitance that is a function of an amount of metallization area provided to electrode 602. It is desirable that a portion of non-metallized region 314' be provided over electrode 602 during the precise alignment of optical fiber 308' with optical device 104 to allow a variation in the third capacitance. For example, as optical fiber 308' is moved in the third direction, the metallization area in parallel with electrode 602 is varied, causing a change in the capacitance. Providing a third electrode may thus provide a measure of fiber position along the third direction.

Figure 7:
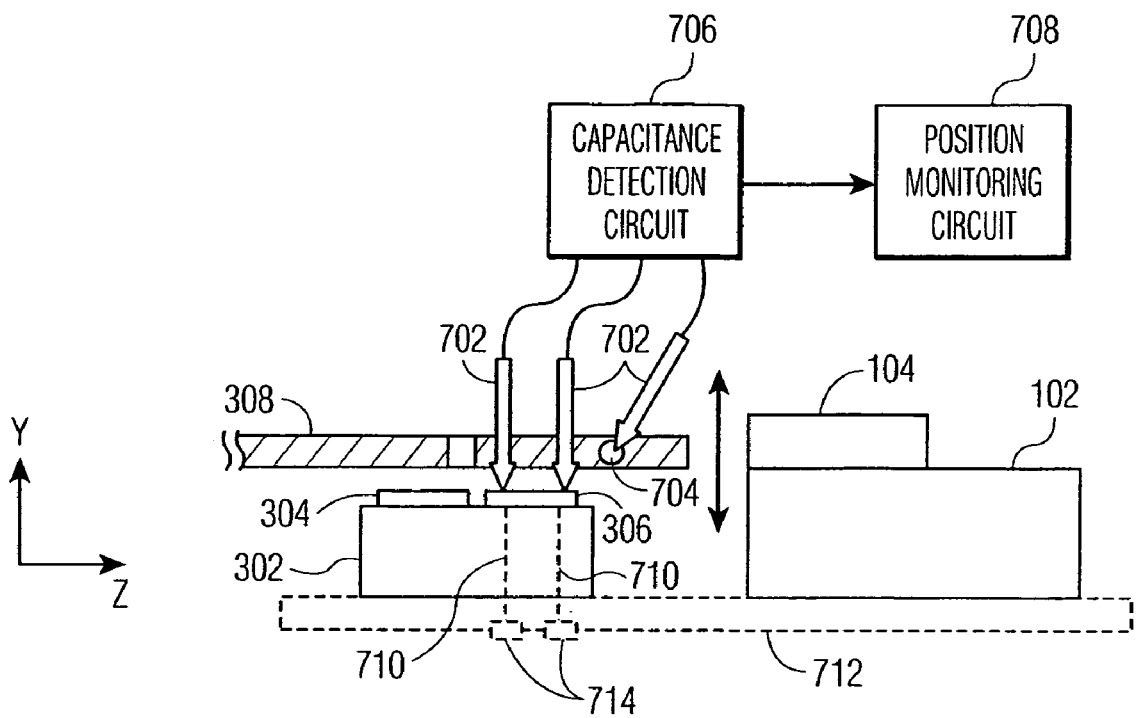
FIG. 7 is a side view of an exemplary alignment measurement system including an exemplary fiber mounting member with two electrodes according to the present invention.

Referring now to FIG. 7, an exemplary optical alignment system for providing alignment in up to two dimensions using an exemplary optical package is described. The exemplary optical alignment system desirably includes capacitance detection circuit 706 coupled to electrical probes 702. Capacitance detection circuit 706 is further coupled to position monitoring circuit 708.

The exemplary optical alignment system is desirably connected to exemplary optical package 300 having a fiber mounting member 302 provided with fiber mount area 304 and electrode area 306 as described above. It is understood that the exemplary optical alignment system may be similarly coupled to exemplary optical package 400 or with any optical package comprising electrodes for measuring a capacitance between the electrodes and the metallized optical fiber.

The exemplary optical alignment system is desirably coupled to exemplary optical package 300 prior to an alignment of the optical fiber. In FIG. 7, electrode area 306 may include two electrodes arranged as illustrated in FIG. 5 and described above. Electrical probes 702 may be directly coupled to electrodes 502 and 504 illustrated in FIG. 5. Alternatively, electrical probes 702 may be coupled to contacts provided on each of electrodes 502 and 504. A further contact 704 may be provided to metallized optical fiber 308 and coupled to a third electrical probe 702. Alternatively, metallized optical fiber 316 may be used with exemplary fiber gripper 318. Fiber gripper 318 may be coupled to the third electrical probe 702. It is understood that the system may provide an alignment in a single direction by using a single electrode 502 as described above.

Capacitance detection circuit 706 may be any of a number of well-known circuits for detecting a capacitance between metallized fiber 308 and each of electrodes 502 and 504. Capacitance detection circuit 706 is coupled to position monitoring circuit 708. Position monitoring circuit 708 desirably stores the capacitance values measured at the peak coupling position. When the coupling element is heated and cooled, the fiber may be displaced, thus causing the capacitance values to change. Position monitoring circuit 708 desirably determines a displacement from the optimal alignment in the first direction and may also determine displacement in the second direction according to the capacitance provided by capacitance detection circuit 706 as described above. The exemplary optical alignment system may thus provide a means for monitoring the optical fiber position in up to two dimensions throughout the alignment process.

An optical fiber alignment to a laser diode is typically less than approximately 2 µm for a multi-mode fiber and typically less than approximately 0.2 µm for single mode fiber in order to obtain a commercially viable coupling efficiency. The inventors have determined that the capacitances measured according to an exemplary embodiment are typically on the order of $10^{-15}$ F and that the present invention provides a misalignment resolution of about a nanometer order.

Exemplary optical package 300 may alternatively include feedthrough connections 710 within mounting member 302 to connect electrodes 502 and 504 to contacts 714, respectively, on optical package base 712. The optical package may thus be directly connected through contacts 714 to an exemplary optical alignment system. A third feedthrough 710 and contact 714 may be provided for a third electrode 602. Alternatively, a single feedthrough 710 and contact 714 may be used if alignment in a single direction is desired. It is understood that feedthrough 710 and contacts 714 as described above may be provided on an optical package base of exemplary optical package 400.

Figure 8:
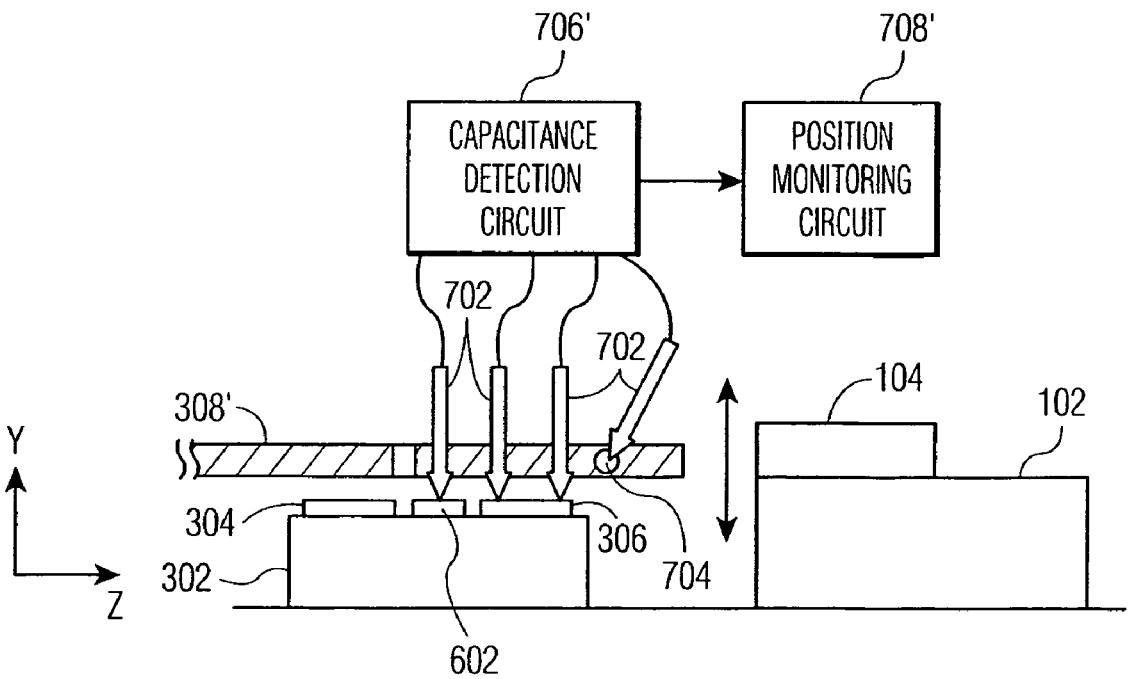
FIG. 8 is a side view of an alternate exemplary alignment measurement system including an exemplary fiber mounting member with three electrodes according to the present invention.

Referring now to FIG. 8, an alternate exemplary optical alignment system for providing an alignment in three dimensions using an exemplary optical package is described. The alternate exemplary optical alignment system desirably includes capacitance detection circuit 706' coupled to electrical probes 702. Capacitance detection circuit 706' is further coupled to position monitoring circuit 708'.

The alternate exemplary optical alignment system may be coupled to exemplary optical package 300. It is understood that the alternate exemplary optical alignment system may be coupled with optical package 400 or any optical package with electrodes provided for measuring a capacitance between electrodes and a metallized optical fiber.

As described above, the alternate exemplary optical alignment system is desirably coupled to exemplary optical package 300 prior to an alignment procedure of optical fiber 308' to optical device 104. A third electrical probe 702 may be directly coupled to a third electrode 602 on fiber mounting member 302, illustrated in FIG. 6. Alternatively, electrical probe 702 may be coupled to a contact 506 provided on electrode 602. Electrodes 502 and 504 are desirably coupled as described above. It is understood that metallized optical fiber 316 may be used with exemplary fiber gripper 318 as described above.

Capacitance detection circuit 706' may be the same as the circuit 706 discussed above except that it detects a capacitance between metallized fiber 308' and each of electrodes 502, 504 and 602. Capacitance detection circuit 706' is coupled to position monitoring circuit 708'. Position monitoring circuit 708' is the same as position monitoring circuit 708' except that it also determines a displacement from the optimal alignment in the third direction as described above. The alternate exemplary optical alignment system may thus provide a means for monitoring the optical fiber position in three dimensions throughout the alignment process.

Figure 9:
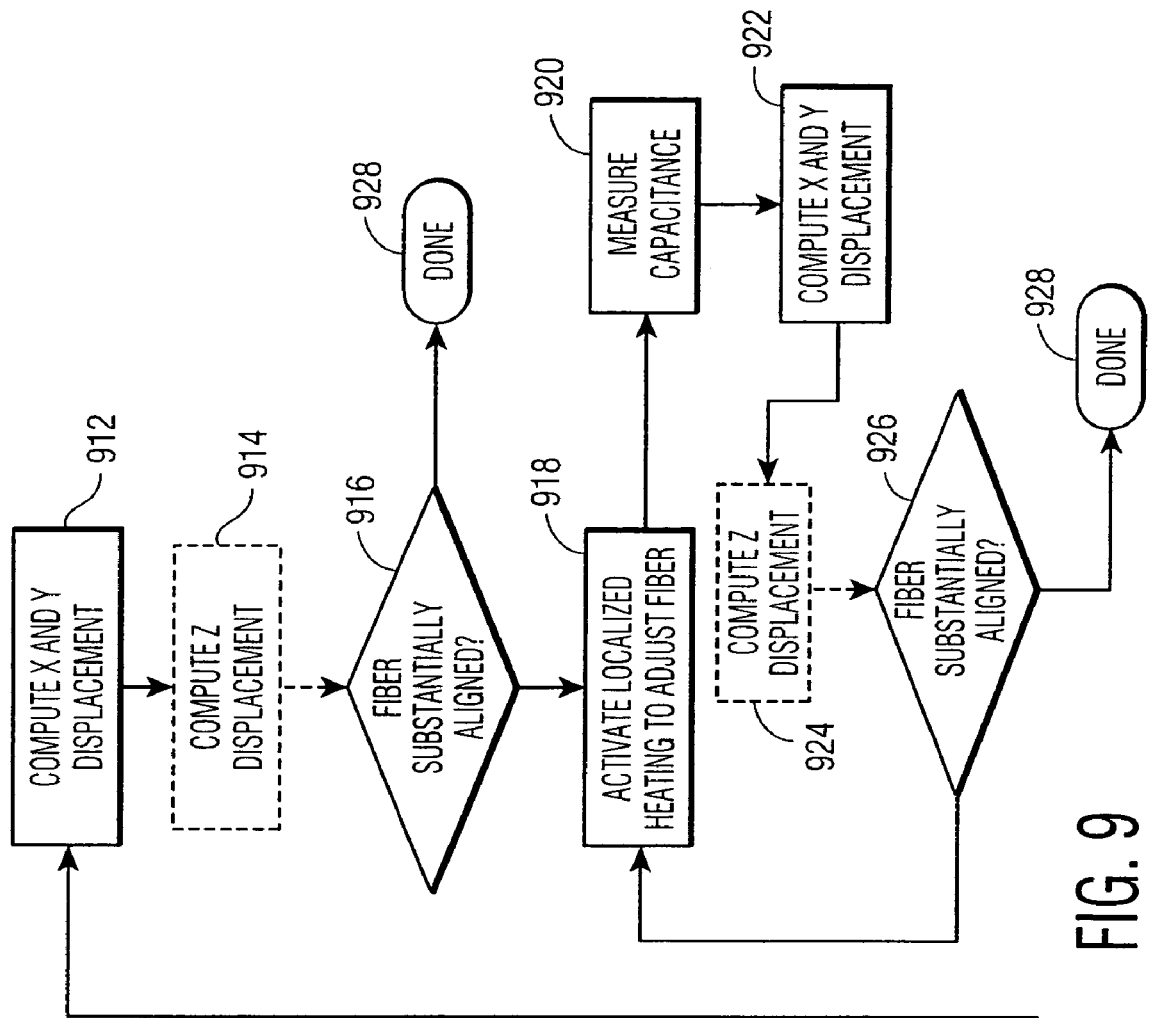
FIG. 9 is a flow chart illustrating an exemplary method of aligning an optical fiber to an optical device according to the present invention.
Figure 9:
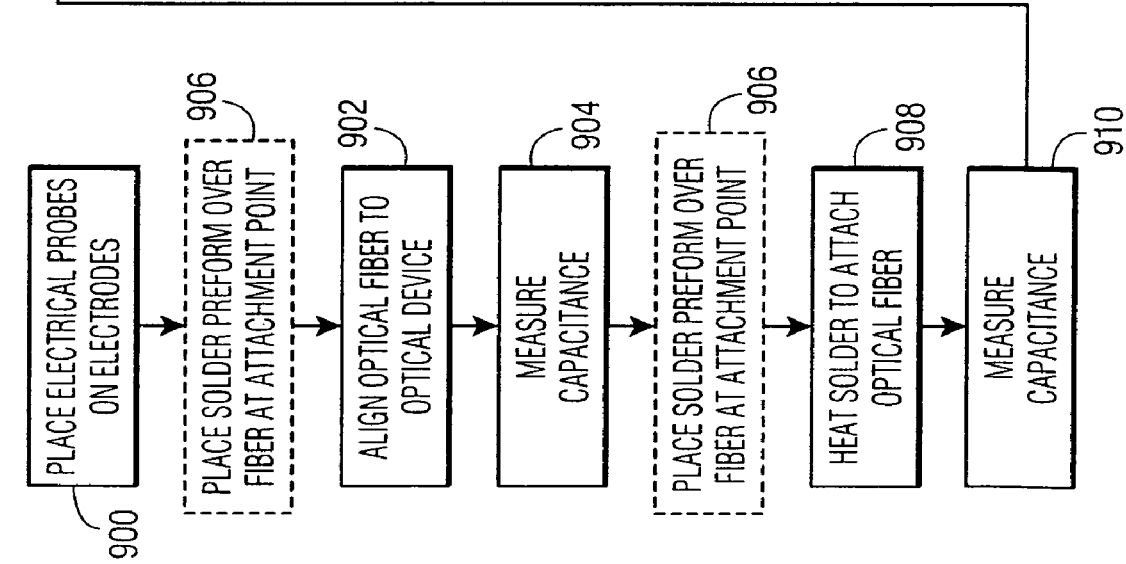

Referring now to FIG. 9, an exemplary method of aligning an optical fiber to an optical device is described. In step 900, electrical probes of an exemplary optical alignment system are coupled to electrodes provided on a fiber mounting member of an exemplary optical device as described above. In step 902, the optical fiber may be aligned to the optical output port by a coarse alignment procedure or a fine alignment procedure described below. In step 904, a capacitance between at least one electrode and a metallized optical fiber is measured as described above to provide a peak coupling position capacitance.

In step 906, a solder preform may be placed over the optical fiber at a fiber attachment point. It is understood that the capacitance may also be measured, step 904 after step 906. It is contemplated that step 906 may be performed between steps 900 and 902.

In step 908, the coupling element may be heated through a solder preform to attach an optical fiber to a fiber mount area. The turbulent flow and capillary forces of the coupling element and its subsequent solidification may cause a misalignment of the optical fiber in at least one direction.

In step 910, at least one capacitance is desirably measured. In step 912, a first and second direction displacement are computed according to the measured capacitance of step 910 and the measured capacitance of step 904. In alternate step 914, a further third direction displacement is computed. It is understood that steps 912 and 914 may be combined into a single step or that only a single direction displacement may be computed according to a desired direction.

Step 916 checks the displacements computed in step 912 against a predetermined threshold to determine the presence of misalignment and the direction of misalignment if more than one displacement direction is measured. If no misalignment is introduced, step 916 leads to step 928, which indicates that the alignment process is complete.

If the attached fiber is not properly aligned, step 916 leads to step 918. In step 918, localized heating is provided to adjust the optical fiber. The at least one direction displacement computed in step 914 may be used to provide localized heating in at least one direction opposing the at least one displacement direction to move the fiber back to the precisely aligned position of step 902. Localized heating may be provided to the optical fiber, to the coupling element or to the fiber mount area and may be a laser heating or a resistive heating. Localized heating may cause the coupling element to be in a plastic state or a fluid state. The localized heating, however, may not provide a complete alignment.

Alternatively, a biasing force may be applied to the optical fiber according to the at least one direction displacement computed in step 914. The biasing force may be applied in at least one opposing direction to the at least one displacement direction with an appropriate force to move the fiber according to the displacement. The fiber, fiber mount area or coupling element may then be heated to heat the coupling element into a plastic or fluid state. The biasing force may move the fiber back to the precisely aligned position of step 902. The biasing force, however, may not provide a complete alignment.

In step 920, at least one capacitance is measured. In step 922, a first and second direction displacement are computed according to the measured capacitance of step 920 and the measured capacitance of step 906. In alternate step 924, a further third direction displacement is computed. It is understood that steps 922 and 924 may be combined into a single step or that only a single direction displacement may be computed according to a desired direction.

Step 926 checks the displacements computed in step 922 against a predetermined threshold to determine the presence of misalignment and the direction of misalignment if more than one displacement direction is measured. If no misalignment is introduced, step 926 leads to step 928, which indicates that the alignment process is complete.

If misalignment is present, steps 918 through 926 are repeated until the displacement is within the predetermined threshold. When the displacement is within the predetermined threshold, step 926 leads to step 928, which indicates that the alignment process is complete.

Figure 10A:
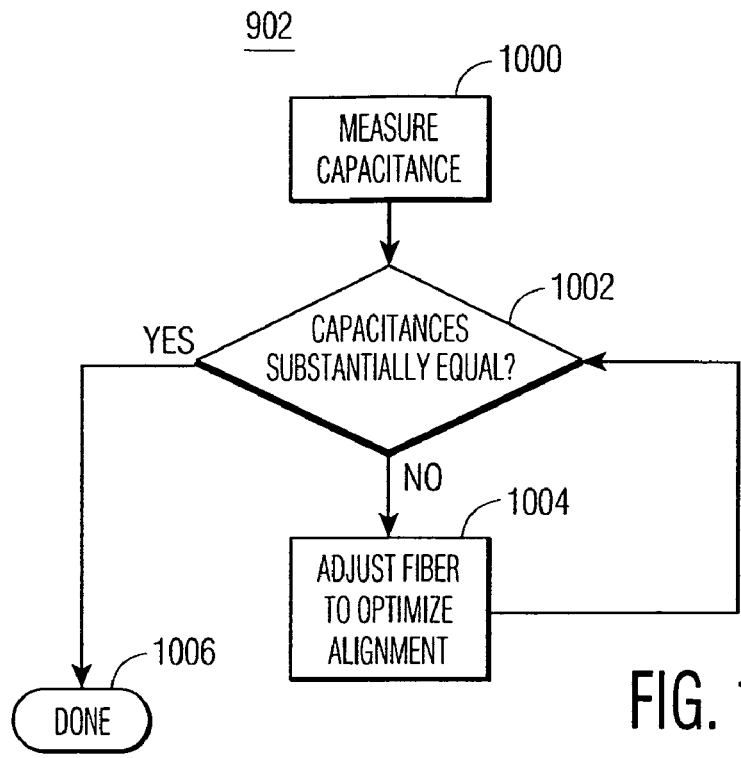
FIG. 10a is a flow chart illustrating an exemplary method of approximately aligning an optical fiber to an optical device according to the present invention.
Figure 10B:
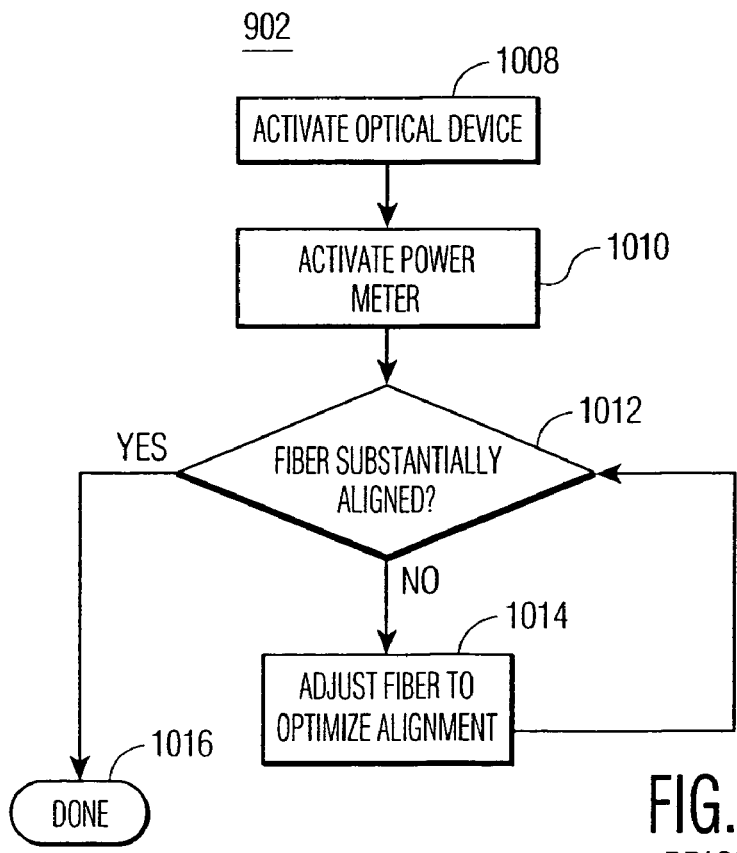
FIG. 10b (Prior Art) is a flow chart illustrating a method of initially aligning an optical fiber to an optical device.

Methods for aligning an optical fiber to an optical device, step 902, are described in FIGS. 10a and 10b. Referring now to FIG. 10a, an exemplary method of coarse alignment of an optical fiber to an optical device is described. In step 1000, two capacitances are desirably measured, such as a capacitance between metallized optical fiber 308 and each of electrodes 502 and 504 as described above. Coarse alignment thus may provide a method of determining alignment in the first direction.

Step 1002 checks if the two capacitances measured in step 1000 are substantially equal to each other. If the capacitances are substantially equal, step 1002 leads to step 1006, which indicates that the coarse alignment process is complete.

If the capacitances are not substantially equal, step 1002 leads to step 1004. In step 1004, the fiber is desirably adjusted to optimize the alignment in the first direction. Steps 1002 and 1004 are repeated until the capacitances are substantially equal. When the capacitances are substantially equal, step 1002 leads to step 1006, which indicates that the coarse alignment process is complete.

Referring now to FIG. 10b, a fine alignment method is described. In step 1008, an optical component within the optical device is activated. In step 1010, a power meter is activated. It is understood that the order of steps 1008 and 1010 may be reversed or that they may be combined into a single step.

Step 1012 checks a coupling efficiency into the optical fiber. A coupling efficiency into the fiber from the activated optical device of step 1008 is measured by the power meter in step 1010. If the fiber is appropriately aligned, a substantial amount of energy from the optical device will be coupled to the fiber, thus providing a high coupling efficiency. If the coupling efficiency is determined to a desired level, step 1012 leads to step 1016, which indicates that the fine alignment process is complete.

If the coupling efficiency not within a desired level, step 1012 leads to step 1014. In step 1014, the optical fiber is adjusted in a first and second direction to optimize the alignment to the optical device. Steps 1012 and 1014 are repeated until the coupling efficiency is within a desired level. When the coupling efficiency is within a desired level, step 1012 leads to step 1016, which indicates that the fine alignment process is complete.

It is contemplated that either the coarse alignment process or the fine alignment process may performed for step 902. It is further contemplated that the course and fine alignment process may be combined into one process for step 902, to optimally align the optical fiber to the optical device.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An optical package base, for use with a conductively coated optical fiber disposed above a top surface of the base and having an end aligned with an optical device, the optical package base comprising:
    two patterned electrodes provided adjacent to the top surface of the optical package base and formed on a single planar surface; and
    a fiber mount area on the top surface of the optical package base,
    wherein the conductively coated optical fiber forms a capacitance with the respective patterned electrode, and
    the optical package base is configured such that the capacitance between the conductively coated optical fiber and each of the patterned electrodes changes when the conductively coated optical fiber is moved in two dimensions.

2. The optical package base according to claim 1, wherein each of the patterned electrodes is triangular shaped.

3. The optical package base according to claim 1, wherein the two patterned electrodes includes first and second adjacent triangular shaped electrodes.

4. The optical package base according to claim 3, wherein the first and second electrodes are disposed to provide a minimum stray capacitance between the electrodes.

5. The optical package base according to claim 3, wherein the two patterned electrodes includes a third electrode adjacent to the first and second adjacent triangular shaped electrodes.

6. The optical package base according to claim 5, wherein each of the first, second and third electrodes are disposed to provide a minimum stray capacitance among the electrodes.

7. The optical package base according to claim 1, wherein the conductively coated fiber ss secured by a fiber gripper, including electrode material coupled to the conductively coated fiber, wherein the fiber gripper is configured to make electrical contact with the conductively coated fiber.

8. The optical package base according to claim 1, wherein each patterned electrode and the conductively coated optical fiber includes a location for receiving a respective electrical probe.

9. An optical alignment system for use with the optical package base according to claim 8, the optical alignment system comprising electrical probes and a capacitance detection circuit for determining the capacitance, the capacitance detection circuit being coupled to the electrical probes.

10. The optical alignment system according to claim 9, wherein the optical package base includes contacts for making contact with the capacitance detection circuit.

11. The optical alignment system according to claim 9, further comprising:
    a means for repositioning the optical fiber in at least one dimension to align the optical fiber with the optical device to provide an optimal alignment of the end of the optical fiber with the optical device; and
    a memory for holding a measured capacitance value provided by the capacitance detection circuit at the optimal alignment.

12. The optical alignment system according to claim 11, wherein the means for repositioning the optical fiber repositions the optical fiber in two dimensions.

13. The optical alignment system according to claim 11, wherein the means for repositioning the optical fiber repositions the optical fiber in three dimensions.

14. An optical alignment system for aligning a conductively coated optical fiber within an optical package with an optical device, the optical alignment system comprising:
    a first electrode means provided on the optical package;
    means for aligning the optical fiber with the optical device to optimally align an end of the optical fiber with respect to the optical device;
    means for measuring a capacitance between the conductively coated optical fiber and the first electrode means when the optical fiber is at the optimally aligned position to develop a first capacitance measure;
    means for attaching the optical fiber to a fiber mount area within the optical package, wherein the means for attaching causes a misalignment in at least one direction between the optical fiber and the optical device;
    means for measuring the capacitance between the conductively coated optical fiber and the first electrode means at the misalignment in the at least one direction to develop a second capacitance measure; and
    means for adjusting the optical fiber to reduce the misalignment in the at least one direction using the first capacitance measure and the second capacitance measure.

15. The optical alignment system according to claim 14, wherein the means for aligning the optical fiber further comprises:
    a second electrode means provided on the optical package;
    means for measuring a further capacitance between the conductively coated optical fiber and the second electrode means to develop a further capacitance measure;
    means for adjusting the optical fiber until the first capacitance measure and the further capacitance measure have substantially equal values when the optical fiber is at the optimally aligned position,
    whereby a coarse alignment of the end of the optical fiber with the optical device at the optimally aligned position is attained.

16. The optical alignment system according to claim 15, wherein the means for measuring the capacitance further includes a means far measuring the further capacitance,
    whereby the first and further capacitance measures provide a two-dimensional measure of misalignment.

17. The optical alignment system according to claim 16, the optical alignment system further including a third electrode means provided on the optical package wherein the means for measuring the capacitance further includes a means for measuring a third capacitance between the conductively coated optical fiber and the third electrode means to provide a third capacitance measure, whereby the first, further and third capacitance measures provide a three-dimensional measure of misalignment.

18. An optical alignment system for aligning a conductively coated optical fiber within an optical package with an optical device to provide an optimally aligned position of an end of the optical fiber with respect to the optical device, the optical alignment system comprising:

two electrode means provided on the optical package;

means for measuring two capacitances between the conductively coated optical fiber and the two electrode means, respectively, to develop first and second capacitance measures; and means for adjusting the optical fiber until the first capacitance measure and the second capacitance measure have substantially equal values, whereby a coarse alignment of the optical fiber at the optimally aligned position is attained.

19. A method for aligning a conductively coated optical fiber within an optical package with an optical device, the method comprising the steps of:

a) aligning the optical fiber with the optical device to provide an optimally aligned position of an end of the optical fiber with respect to the optical device;

b) measuring a capacitance between the conductively coated fiber and an electrode provided on an optical package at the optimally aligned position to develop a first capacitance measure;

c) attaching the optical fiber to a fiber mount area within the optical package, wherein attaching the optical fiber causes a misalignment in at least one direction between the optical fiber and the optical device;

d) measuring the capacitance when the optical fiber is misaligned in the at least one direction to develop a second capacitance measure;

e) adjusting the optical fiber to reduce the misalignment in the at least first direction; and f) repeating steps (d) and (e) until the first capacitance measure and the second capacitance measure are equal to within a predetermined tolerance.

20. The method according to claim 19, wherein the step of aligning the optical fiber further comprises the steps of:

a1) activating the optical device;

a2) measuring an optical power from the optical device into the end of the optical fiber to determine a coupling efficiency between the optical fiber and the optical device;

a3) adjusting the optical fiber according to the coupling efficiency; and a4) repeating steps (a2) and (a3) until the coupling efficiency is within a predetermined tolerance, whereby a fine alignment of the end of the optical fiber with respect to the optical device is attained.

21. The method according to claim 19, wherein the step of aligning the optical fiber further comprises the steps of:

a1) measuring the first capacitance;

a2) measuring a further capacitance between the conductively coated optical fiber and a second electrode provided on the optical package to develop a further capacitance measure;

a3) adjusting the optical fiber; and a4) repeating steps (a1) and (a3) until the first capacitance measure and the further capacitance measure are substantially equal, whereby a coarse alignment of the end of the optical fiber with respect to the optical device is attained.

22. The method according to claim 21, wherein the step of measuring the capacitance further includes measuring the further capacitance measure, whereby the first and further capacitance measures provide a two-dimensional measure of misalignment.

23. The method according to claim 22, wherein the step of measuring the capacitance further includes measuring a third capacitance between the conductively coated optical fiber and a third electrode provided on the optical package to provide a third capacitance measure, whereby the first, further and third capacitance measures provide a three-dimensional measure of misalignment.

24. A method for aligning a conductively coated optical fiber within an optical package with an optical device to provide an optimally aligned position of an end of the optical fiber with respect to the optical device, the method comprising the steps:

a) measuring two capacitances between the conductively coated optical fiber and two electrodes, respectively, to develop first and second capacitance measures, respectively;

b) adjusting the optical fiber; and c) repeating steps (a) and (b) until the first capacitance measure and the second capacitance measure are substantially equal, whereby a coarse alignment of the end of the optical fiber with respect to the optical device is attained.

* * * * *